United States Patent [19]

Hibner et al.

[11] Patent Number: 4,947,639

[45] Date of Patent: Aug. 14, 1990

[54] APPARATUS AND METHOD FOR SUPPORTING A ROTATING SHAFT IN A ROTARY MACHINE

[75] Inventors: David H. Hibner, Colchester; Dennis F. Buono, Manchester; Kurt M. Dembeck, Vernon; Roy D. Franceschet, North Haven, all of Conn.

[73] Assignee: United Technologies Corporation, Hartford, Conn.

[21] Appl. No.: 193,449

[22] Filed: May 12, 1988

[51] Int. Cl.$^5$ ............................................. F02G 3/00
[52] U.S. Cl. ................................... 60/39.02; 384/99; 384/535
[58] Field of Search ............... 60/39.02, 39.31, 39.091; 184/6.11; 384/99, 535, 101, 102, 581

[56] References Cited

U.S. PATENT DOCUMENTS

| Re. 31,394 | 9/1983 | Streifert | 384/99 |
|---|---|---|---|
| 2,729,518 | 1/1956 | O'Connor | 384/99 |
| 2,961,277 | 11/1960 | Sternlicht | 384/99 |
| 3,124,395 | 3/1964 | Sternlicht | 384/399 |
| 3,456,992 | 7/1969 | Kulina | |
| 3,610,712 | 10/1971 | Endress | 384/401 |
| 3,617,102 | 11/1971 | Wada et al. | 384/114 |
| 3,756,672 | 9/1973 | Hibner et al. | |
| 4,046,430 | 9/1977 | Buono et al. | |
| 4,084,861 | 4/1978 | Greenberg et al. | |
| 4,119,375 | 10/1978 | Kirk et al. | 384/369 |
| 4,193,644 | 3/1980 | Miyashita et al. | 384/107 |
| 4,213,661 | 7/1980 | Marmol | 384/99 |
| 4,337,983 | 7/1982 | Hibner | 384/99 |
| 4,353,604 | 10/1982 | Dulberger et al. | |
| 4,404,724 | 12/1983 | Christ et al. | 29/116.2 |
| 4,440,456 | 4/1984 | Klusman | 384/582 |
| 4,643,592 | 2/1987 | Lewis et al. | 384/99 |
| 4,655,248 | 4/1987 | Chalaire | 137/515.7 |
| 4,669,893 | 6/1987 | Chalaire et al. | 384/99 |
| 4,722,666 | 2/1988 | Dennison et al. | 416/94 |
| 4,775,248 | 10/1988 | Barbic et al. | 384/99 |
| 4,782,919 | 11/1988 | Chalaire et al. | 184/6.11 |

Primary Examiner—Louis J. Casaregola
Assistant Examiner—Timothy S. Thorpe
Attorney, Agent, or Firm—Gene D. Fleischhauer

[57] ABSTRACT

A rotary machine 10 includes a rotor shaft 40 and a support system 63 for the shaft. The support system includes a spring 68 and viscous damper 70.

Means for removing oil from the damper at preselected rotor speeds is provided and in one embodiment permits operating the engine over a rotor speed range which avoids critical speeds.

10 Claims, 8 Drawing Sheets

APPARATUS AND METHOD FOR SUPPORTING A ROTATING SHAFT IN A ROTARY MACHINE

TECHNICAL FIELD

This invention relates to a method and apparatus for supporting a rotating shaft in a rotary machine. More particularly, the invention relates to reducing vibrations in machine structure, such as in the rotating shaft or in the support structure for the rotating shaft. The invention was developed in the field of axial flow rotary machines, and in particular gas turbine engines, but has application to other fields where viscous damping is employed to reduce vibrations.

BACKGROUND

Rotary machines employing rotor shafts supported by a bearing from a support structure are commonly used in gas turbine engines. During operation of these engines, the range of rotational speed of the rotor may vary from low speeds to high speeds of over ten thousand revolutions per minute.

As pointed out in U.S. Pat. No. 4,669,893 issued to Chalaire et al entitled "Annular Oil Damper Arrangement", small imbalances associated with the rotating shaft may cause the actual axis of the rotor shaft to cyclically orbit the ideal axis of the rotor shaft with a frequency equal to the angular speed of the shaft.

Such orbiting motion is commonly referred to as syncronous vibration or whirl of the shaft. The lateral or transverse vibration of the center line of the shaft away from the ideal center of rotation increases as the rotor speed of the shaft approaches the resonant frequency of the support system (critical speed) associated with one of the different modes of vibration of the shaft. The resonant frequency is a function of the stiffness of the support system.

Vibratory forces in the rotor shaft are transmitted from the rotor shaft through the support system to the engine and from the engine to its mounting structure. Because the displacement of the shaft from the ideal axis of rotation is believed to increase these forces, devices are often employed to decrease the actual displacement of the shaft from the ideal center line of the shaft.

As shown in U.S. Pat. No. 4,669,893 issued to Chalaire, one device for decreasing the displacement of the shaft and, therefore, the forces which are transmitted from the shaft to the engine and to its supporting structure is a viscous damper having a fluid damping film which is disposed between the rotor system and its support. As shown in Chalaire, the film is disposed between the bearing housing of the rotor and the adjacent structure. Other examples of such dampers are shown in: U.S. Pat. No. 4,337,983 issued to Hibner entitled "Viscous Damper"; U.S. Pat. No. 4,084,861 issued to Greenberg et al entitled "Thrust Bearing Damping Means"; and, U.S. Patent Re. 31,394 issued to Streifert entitled "Flexible Damped Bearing Assembly".

In several of these dampers, the support for the shaft includes a bearing and its housing. The bearing and housing are positioned by a spring which resists the movement of the shaft away from the ideal center line of the shaft. The damper through its fluid damps orbital motion of the shaft. Damping is especially critical if the shaft is rotated at a speed which is the natural resonant frequency of the support system. As mentioned earlier, the speed is commonly referred to as the critical speed of the support system and is a function of the stiffness of the support system.

U.S. Pat. No. 3,756,672 issued to Hibner et al entitled "Shaft Damping Arrangement" and U.S. Pat. No. 4,046,430 issued to Buono and Hibner et al entitled "Damped Intershaft Bearing and Stabilizer" show the use of viscous dampers of the type discussed above for damping vibrations in concentric shafts. In U.S. Pat. No. 4,046,430, one shaft of a pair of concentric shafts is the structure from which the positioning spring extends to the bearing housing. The shaft with the bearing housing bounds the viscous damper cavity. Thus, the support structure for the bearing is a rotating component of the engine. In this particular invention, the spring in parallel with the damper is used to change the resonant frequency of one of the shafts so that the critical speed of the other shaft is no longer in the operating range of the engine.

Another approach is to use both viscous and frictional damping to damp vibrations as is shown in U.S. Pat. No. 4,353,604 issued to Hibner et al entitled "Viscous/Friction Damper". As shown in this patent, the support system for a rotating shaft includes both a viscous damper and a friction damper which is in series with the viscous damper. The friction damper is activated when a large imbalance of the engine rotor takes place which exceeds loads normally handled by the viscous damper.

Viscous and frictional damping are shown in U.S. Pat. No. 4,213,661 issued to Marmol entitled "Bearing Support Structure Combining Fluid Damping and Spring Damping Apparatus". In this patent, a plurality of arcuate beams are disposed in the damping cavity to provide frictional damping to the bearing.

A viscous and frictional damper is also shown in U.S. Pat. No. 3,456,992 issued to Kulina entitled "Vibration Damping Device". In Kulina, the squeeze film damper uses piston ring seals which seal the damper cavity. The piston ring seals are used as frictional devices pressed by damping fluid pressure against the walls bounding the damping cavity to develop a frictional force. Because the frictional force is proportional to pressure in the cavity and because the pressure in the cavity affects the viscous and stiffness characteristics of the damping medium, it is possible to tune the damper so as to get maximum viscous and frictional damping of motion at the critical speed characteristic of the rotor shaft. This provides damping of vibrations at the critical speeds for the shaft.

The above art notwithstanding, scientists and engineers working under the direction of Applicant's assignee are seeking to develop other devices for effectively reducing vibrations from rotor whirl.

DISCLOSURE OF INVENTION

This invention is predicated in part on the recognition that the presence of the damping fluid in viscous dampers under certain operating conditions may increase vibration in a rotary machine such as in the rotor shaft or in the support structure for the shaft.

According to the present invention, a support system for a rotor shaft includes a viscous damper having a damping chamber through which fluid damping medium is flowed and a device for allowing the flow of damping medium to the damper chamber at a first rotor speed to activate the damper and for blocking the flow of damping medium to the chamber in response to a second rotor speed, to remove the damper from the support system.

In accordance with one embodiment of the present invention, the device permits flow to the fluid damper at speeds no greater than the idle speed for the engine and prevents flow of oil to the damper at speeds above the idle speed characteristic.

According to one embodiment of the present invention, a method of operating a rotary machine having a rotating shaft and a viscous damper for the shaft includes flowing fluid damping medium to the damper at certain preselected rotor speeds and not flowing at other speeds to remove the damper from the machine.

A primary feature of the present invention is a support system for a rotary machine having a viscous damper which is disposed between a rotor shaft and the adjacent structure from which the shaft is positioned. A spring extends from the adjacent support structure to position the shaft in the damper. The damper has a damping chamber and means for venting the chamber which allows fluid damping medium to escape from the chamber. In one embodiment, the means for venting are passages, either small connected passages such as exist between the seals of the damping cavity, or in another embodiment, the passage is a larger discrete passage, such as an outlet conduit. Another primary feature is a device for turning on or off the flow of damping medium to the damping chamber in combination with the drain passage. In one embodiment, a pump driven by the rotor shaft for pressurizing the fluid damping medium supplies the damping medium at a pressure which is indicative of the speed of the rotor shaft. The device for turning on or off the flow of damping medium to the chamber is a check valve sensitive to the pressure of the damping medium. In one of these embodiments, the device for turning on or off the flow includes a pair of check valves in parallel, one permitting flow below a certain pressure (thereby turning off flow above a preselected first rotor speed) and the other permitting flow above a certain pressure (thereby turning on flow at a second rotor speed which is greater than the first rotor speed). In an alternate embodiment, the on-off flow device is an on-off solenoid valve responsive to a rotor speed signal.

Another feature of the present invention is a support system for the rotor shaft having a first stiffness characteristic (and an associated first critical speed characteristic) which results from flowing damping medium to the damping chamber and filling the damping chamber with the fluid damping medium; and, a second stiffness characteristic (having a second critical speed characteristic) which results from not flowing damping fluid medium to the damping chamber such that the fluid damping medium has no hydrodynamic stiffness. In one detailed embodiment, the method includes activating the damper at the first critical speed characteristic to damp vibrations of the rotary machine and removing the damper from the support system at a higher rotor speed to avoid the second critical speed characteristic of the support system. In an alternate embodiment, the method is to activate or inactivate the damper to operate all rotor speeds away from critical speed characteristic of the system.

A primary advantage of the present invention is the fatigue life of components which results from reducing the level of vibrations in a rotary machine by employing a viscous damper over a specific speed range and removing the damper from the system over another speed range. Another advantage is the reduction in vibrations and noise transmitted from the exterior of the machine to adjacent structure which results from reducing vibrations in the machine. In one embodiment, an advantage is a rotary machine which avoids and never operates at a critical speed characteristics by selectively changing the system stiffness through turning on and off the viscous damper to change the critical speed characteristics of the engine as a function of rotor speed. In one embodiment, an advantage is the simplicity of operation which results from the automatic removal of the damper from the system by using a pressure sensitive check valve and a fluid damping medium having a pressure which is indicative of rotor speed.

The foregoing features and advantages of the present invention will become more apparent in light of the following detailed description of the best mode for carrying out the invention and the accompanying drawing.

BEST MODE FOR CARRYING OUT THE INVENTION

Figure 1:
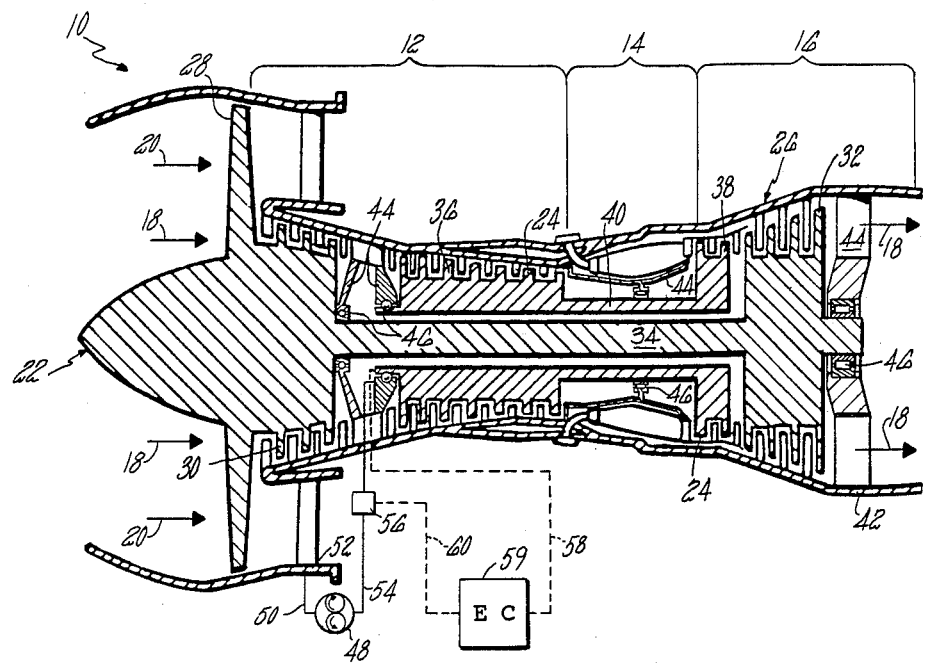
FIG. 1 is a schematic representation of an axial flow rotary machine, such as turbofan gas turbine engine, showing the principal sections of the engine.

FIG. 1 is a schematic representation of an axial flow rotary machine, such as a turbofan gas turbine engine 10 of the type used to propel aircraft. The engine has a compression section 12, a combustion section 14, and a turbine section 16. An annular flowpath 18 for primary working medium gases extends axially through the sections of the engine. An annular flowpath 20 for secondary working medium gases extends through a portion of the compression section outwardly of the primary flowpath.

Rotor assemblies, such as a low pressure rotor spool 22 and a high pressure rotor spool 24, extend axially through the engine. A stator assembly 26 extends circumferentially about the rotor assembly and axially through the engine for supporting the rotor assemblies and for outwardly bounding the working medium flowpaths.

In the compression section 12, the low pressure rotor spool 22 includes an array of relatively large fan blades 28 which extend outwardly across the primary and secondary flow paths for working medium gases. Arrays of shorter low pressure compressor blades 30 extend into the primary flow path. The turbine section 16 also includes arrays of turbine rotor blades 32 extending into the primary flow path. A rotor shaft 34 extends between the bladed portions of the low pressure turbine and the low pressure compressor to connect these portions of the two sections of the engine together.

The high pressure rotor spool includes arrays of rotor blades 36 in a second or high pressure compressor which also extend outwardly across the primary flow path. The high pressure turbine section includes arrays of rotor blades 38 joined by a rotor shaft 40 which extends axially through the engine outwardly of the low rotor shaft to connect these bladed portions of the high pressure turbine and the high pressure compressor.

The stator assembly 26 includes structure, such as an outer casing 42 and discrete support structures at axially spaced locations which extend radially inwardly to support the rotor shafts of the low pressure and high pressure spools 22, 24. Such support structure includes array of struts or support elements 44 and other components, such as bearings 46. Alternatively, the support structure might be an adjacent rotor shaft as shown in U.S. Pat. No. 4,046,430 entitled "Damped Intershaft Bearing and Stabilizer".

It is desirable to provide damping to some or all of the bearings to damp vibrations in the rotor shaft using a pressurized damping medium, such as with a squeeze film damper. Means for pressurizing the fluid, such as a pump represented by the gear pump 48, supplies a suitable damping medium (fluid) to the support structure for a rotor spool, such as the high rotor spool 24, to provide viscous damping to the high rotor shaft 40. The term fluid includes any suitable medium capable of flow under pressure. One suitable fluid is lubricating oil.

In the case of lubricating oil, the pump is in flow communication through a conduit 50 with a source of oil for the engine, such as a scavenge region 52 in the gearbox (not shown) of the engine which collects oil after it has performed its lubricating function. A conduit 54 extends from the pump to the support structure. As is commonly done with many modern engines, a tower shaft (not shown) is drivingly connected to the high pressure rotor shaft and to the gear pump via other shafts (not shown) to drivingly connect the gear pump to the high rotor shaft. As a result, the output pressure level of the pump increases with increases in the rotor speed of the high pressure rotor shaft.

Means, as represented by the valve 56, to allow flow or block flow of the oil to the support is in flow communication with the pump 48. The valve may be a check valve apparatus responsive to a pressure of the oil. Alternatively, the valve might be a solenoid operated valve responsive as shown by the dotted line 58, to a signal from the engine control apparatus 59. The engine control apparatus senses the rotational speed ($N_2$) of the high rotor shaft about its axis of rotation either directly, or, indirectly by measuring parameters of the engine. The engine control generates an on or off signal to the solenoid valve in response to rotor speed as represented by the dotted line 60 extending from the engine control to the valve.

Figure 2:
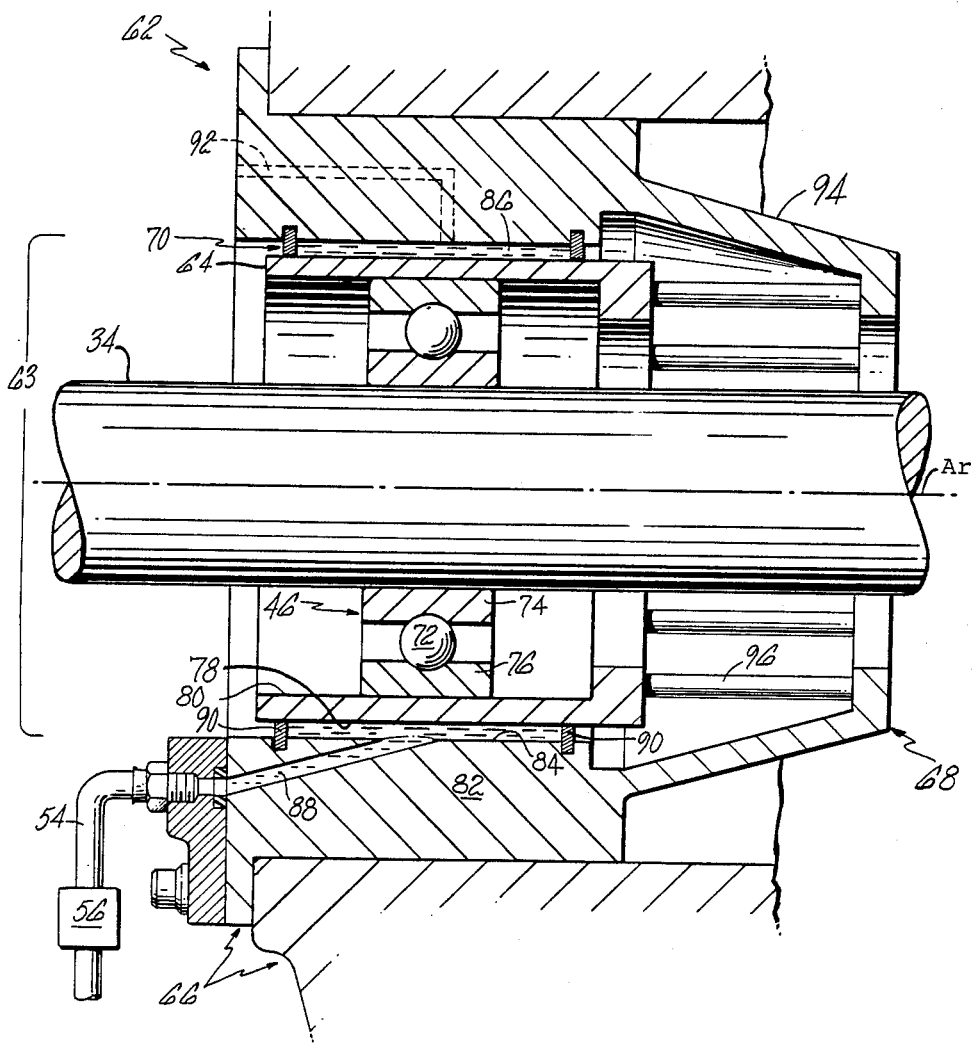
FIG. 2 is a simplified cross-sectional view of a portion of the engine showing a typical support system rotor shaft which includes a viscous damper.

FIG. 2 is a simplified cross-sectional view of a portion of a gas turbine engine showing a typical support structure 62 for a rotor assembly having a rotor shaft 34 of the type used in modern jet engines. The term rotor shaft includes any portion of the rotor assembly which is used to rotatably support the rotor assembly. The support structure 62 includes, a bearing 46 and its housing 64, an adjacent stator structure 66 and in terms of structural stiffness a more flexible support system 63 of spring 68 and damper 70 between the housing 64 and stator structure 66. Because the stiffness (or spring constant) of the support structure is primarily a function of the flexible spring and damper, the spring and damper are typically referred to as the support system for the rotor shaft, and the stiffness of the spring and damper are conventionally referred to as the stiffness of the support structure.

The rotor shaft 34 is rotatable about an axis of rotation $A_r$ at a range of speeds which include a first speed and a second speed. The bearing 46 is represented in this particular embodiment by a bearing having rolling elements such as 72 balls disposed between an inner race 74 and an outer race 76. The inner race engages the rotor shaft.

The inner housing 64 is nonrotating and has an outer surface 78 and an inner surface 80. The inner housing supports the rotating components of the bearing such as the inner race 74 and the balls 72 of the bearing. In the particular construction shown, the outer race 76 engages the balls and is engaged by the inner surface of the inner housing. In alternate constructions, the inner housing might be formed as one piece with the outer race.

The adjacent stator structure 66 of the support structure 62 includes an outer housing 82. The outer housing has a cylindrical surface 84 facing inwardly which is spaced radially from the outwardly facing cylindrical surface 78 of the inner housing leaving a chamber 86 for the damping oil therebetween. In the embodiment shown, the outer housing is nonrotating. The outer housing further includes means for supplying oil to the chamber, such as at least one inlet conduit as represented by the inlet conduit 88.

A pair of ring seals 90 are disposed between the inner housing and the outer housing. The ring seals are spaced axially apart and extend circumferentially about the axis of the engine. Each ring seal engages one of the housings in the radial direction and engages the other housing to seal the damping chamber. The ring seals are not absolutely fluid tight and provide means for venting the damping chamber through small connected passages (not shown) which provide a flow path from the damping cavity. Alternatively, an elastomeric seal might extend between the outer housing and the inner housing to make the chamber relatively fluid tight. In such constructions, the means for venting may be an annular outer housing having at least one outlet conduit, as represented by the outlet conduit 92 shown by the dotted lines, for discharging oil from the chamber 86. Of course, other means for venting the chamber might be used.

In some constructions, the damping chamber may not be sealed but in flow communication with or disposed in a reservoir of fluid. If the damping chamber is disposed in a reservoir the fluid may be vented from the reservoir, such as by pumping. An example of such an unsealed damper is shown in FIG. 2 of U.S. Pat. No. 4,337,983.

The spring 68 of the support system 63 is integral with (that is, acts as one piece) with the outer housing 82. The spring includes an annular support 94 which has axially extending portions as represented by the four rods 96. The rods are relatively flexible in comparison to the annular support 94. More rods might be used; for example, in one construction thirty-two rods have been used. And, the annular support might be made more flexible. The spring might also be formed of a cylinder having cut out portions, thin sections, or other features which impart flexibility. As a result of its flexible construction, the spring imparts to the support system a mechanical spring constant or mechanical stiffness characteristic km.

As mentioned above, the gear pump 48 provides means for supplying pressurized fluid damping medium to the inlet conduit 88. Because the gear pump is drivingly connected to the high pressure rotor shaft 40, the output level of pressure of the gear pump increases with rotor speed. Therefore, for each associated rotor speed, oil is flowed from the pump at a pressure level associated with that rotor speed.

Means 56 responsive to the rotor speed is attached to the adjacent stator structure 66 to allow the flow of damping fluid at a first rotor speed to the damping chamber 86 and to block the flow of damping fluid to the damping chamber at a second rotor speed. As discussed with regard to FIG. 1, the means might be a valve responsive to pressure level of the lubricating oil such as a pressure sensitive check valve or might be a solenoid operated valve responsive to a signal from the engine control. As will be realized, other means might be used to interrupt the flow of oil to the damping chamber in response to the speed of the rotor shaft.

Figure 3:
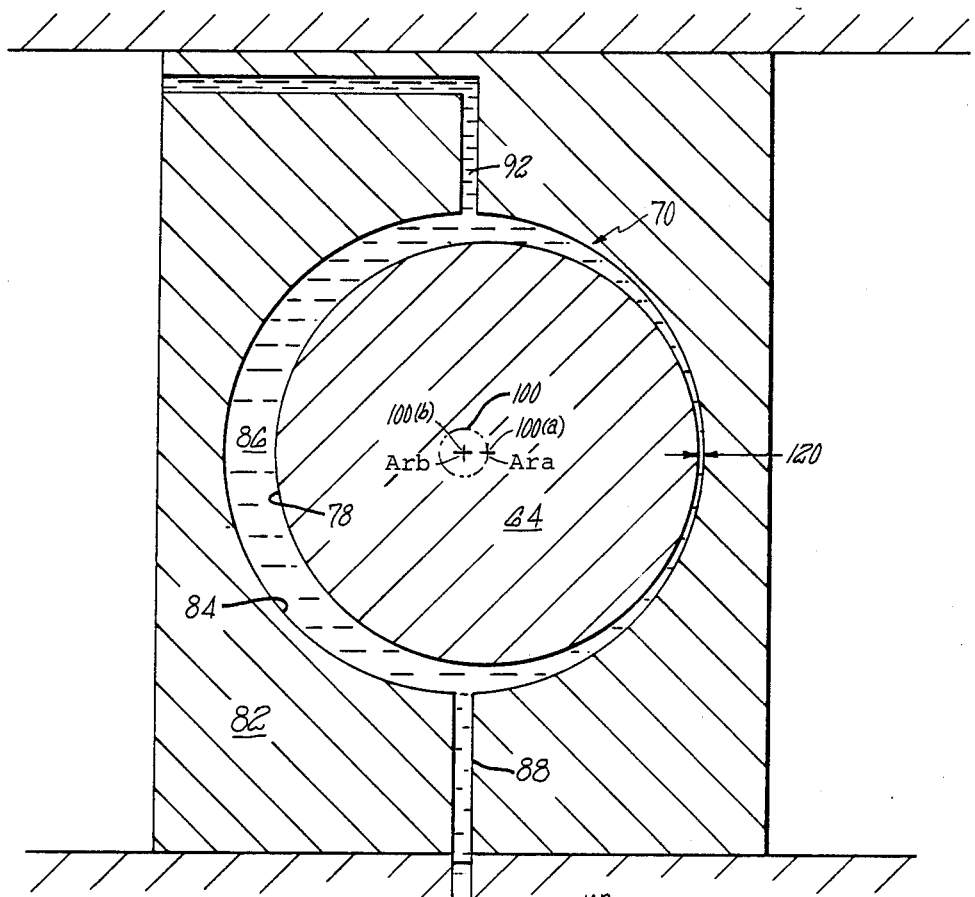
FIG. 3 is a diagramatic cross-sectional view of the damper shown in FIG. 2 showing pressure sensitive on-off valves for flowing damping fluid to the damper.

FIG. 3 is a diagramatic cross-sectional view of the fluid damper shown in FIG. 2. Similar views are shown in U.S. Pat. No. 4,669,893 issued to Chalaire, Hoyt and Hurchalla entitled "Annular Oil Damper Arrangement" and U.S. Pat. No. 4,867,655 issued to Hibner et al entitled "Variable Stiffness Oil Film Damper".

FIG. 3 shows the outer support housing 82 disposed about the cylindrical inner member or housing 64 which is subject to attempted cyclical orbital motion 100. Center 100a is the actual center of the rotor system representing the actual axis of rotation Ara of the rotor shaft 40. Center 100b is the ideal center of the rotor system, representing the ideal axis of rotation Arb, which for an ideal cylindrical bearing 46, inner housing 64 and outer housing 82 is in the center of the inner surface 84 of the outer housing 82.

A flow of damping fluid is introduced into the annular volume or damping chamber 86 formed between the inner surface 84 of the outer housing 82 and the outer surface 78 of the housing 64 via supply conduit 88. Means for venting the damper chamber are represented by the outlet conduit 92 and, as discussed earlier, may represent piston ring seals or some like device for venting the damping chamber. The supply conduit 88 has two pressure responsive check valves placed in parallel in the system as represented by the check valve 102 and the check valve 104 which together act as the means 56 for allowing or blocking flow under preselected operating speeds. The check valve 102 has a spring 106 which opposes the pressure force exerted by the oil on a poppet 108. At a predetermined pressure level, which corresponds to a predetermined rotor speed, the pressure of the oil forces the poppet to the closed position shutting off the flow of oil through the check valve. The second check valve has a spring loaded poppet 110 which is held in the closed position by the spring. As the pressure level rises, corresponding to a third rotor speed which is higher than the second rotor speed, the poppet opens and permits flow of fluid to the damping chamber 86. One pressure sensitive valve thought to be satisfactory for allowing the flow of oil below a certain pressure but blocking the flow of oil at another pressure and above is available from the Janitrol Aero Division of the Midland Ross Corporation and is designated as "Shut Off Valve Model 10P22-2; 12P70".

Figure 3B:
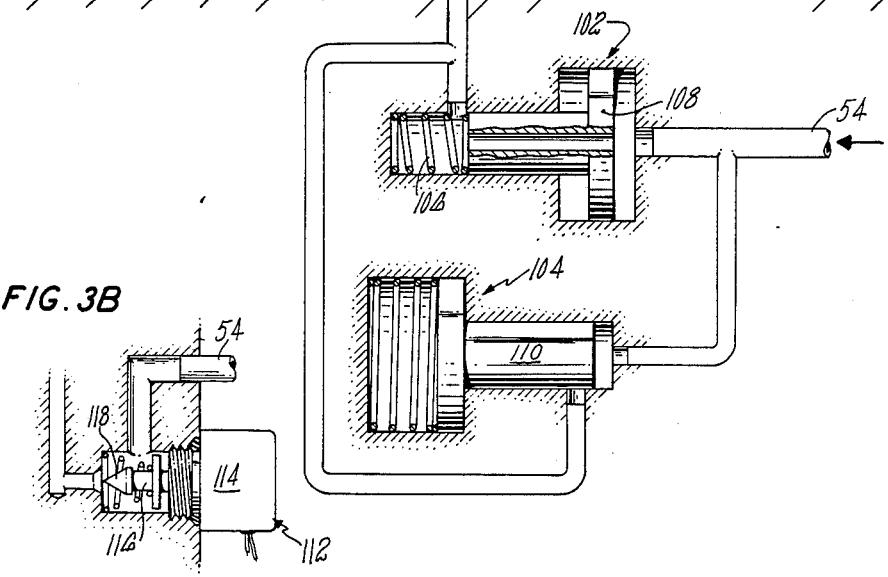
FIG. 3B is an alternate embodiment of one of the valves shown in FIG. 3.

Alternatively, the means for allowing or blocking flow to the annular volume 86 might be an on-off solenoid valve 112 of the type shown in FIG. 1 and in FIG. 3B. In this embodiment a solenoid coil 114 is disposed about a movable armature 116 attached to the poppet. Upon a signal from the engine control when a preselected rotor speed is reached, the solenoid is energized causing the armature to move in a direction opposed by the spring to the closed position. At another preselected rotor speed the solenoid coil is de-energized and the spring moves the poppet to the open position permitting flow through the valve.

Thus below the first rotor speed or above the second rotor speed, fluid is allowed to fill the annular volume 86. The fluid eventually exits through the means for venting the damper chamber as represented by the vent opening or outlet conduit 92 which is disposed in the outer housing 82.

During operation, the damper 70 thus described absorbs the vibrational energy of the inner housing 64 through hydrodynamically created forces resulting from the presence of the damping oil in the annular damping chamber 86. The damping force exerted by the oil that opposes the orbiting motion causes the oil to be heated thus transforming a portion of the vibratory kinetic energy into heat energy.

The phenomena by which exciting forces are transmitted from the housing through the hydrodynamic interactions to the outer housing are not well understood. One well accepted working hypothesis is explained with reference to FIG. 4A and FIG. 4B which are schematic representations of the structure shown in FIG. 3.

As is well accepted, the orbital motion 100 of the inner housing 64 causes a circumferential pressure wave to be propagated around annular damping chamber 86. The pressure wave is in advance of the orbiting line of closest approach 120 between the inner housing 64 and the outer support housing 82. The local fluid pressure reaches a maximum within the circumferential pressure wave. The local fluid pressure produces a damping force that opposes the orbiting motion and spring forces that act either in the same direction as the spring force of the spring or mechanical support 68 or in the opposite direction. A local region of relatively low pressure also trails the sleeve 64. This is identified as the cavitation region on FIGS. 4A and 4B.

As the nonrotating inner housing 64 whirls about the ideal axis 100b, the shaft has the actual axis of rotation 100a. An imaginary line, the "line of centers" passes through the actual axis 100 and the ideal axis of rotation 100b. The line of centers provides a reference axis for vectors of force which represent the forces exerted by the fluid on the shaft. For example, the viscous damping force $F_b$ which results from the viscous characteristic of the fluid opposes motion of the shaft, acts in a direction perpendicular to the line of centers and is proportional to the tangential velocity of the shaft.

Three other forces act along the line of centers. One is the mechanical spring force from the spring 68 and its flexible rods 96; the two other forces are associated with the damping fluid or oil. One force associated with the damping fluid is the resultant of forces created by the pressure wave. This force has an associated viscous stiffness characteristic kf. The viscous stiffness force $F_{kf}$ acts along the line of centers toward the ideal axis of rotation 100b in the same direction as the mechanical spring force of the rods, that is, to oppose deflection of the shaft housing from the ideal axis 100b. Thus, both the mechanical spring force $F_{km}$ and the viscous spring force $F_{kf}$ resist deflection of the shaft in the outward direction and are analogous to a spring having a stiffness characteristic kf+km.

The spring force $F_{kf}$ and $F_{km}$ are resisted by a negative spring force $-F_{ki}$ acting in the direction of deflection of the shaft housing. The force $F_{ki}$ is proportional to the mass of the fluid and is referred to as the fluid inertial force. This force is analogous to a spring having a stiffness ki. The force of magnitude $F_{ki}$ is considered negative $(-F_{ki})$ because the force acts in a direction opposite to the force exerted by the mechanical spring rods and the fluid pressure force. The summation of the fluid associated forces $F_{kf}$ and $-F_{ki}$ is the hydrodynamic spring force $F_{kh}$. As will be realized, $F_{kh}$ may be positive or negative depending on the relative magnitude of the viscous stiffness force $F_{kf}$ and the fluid inertial force $-F_{ki}$.

Figure 4A:
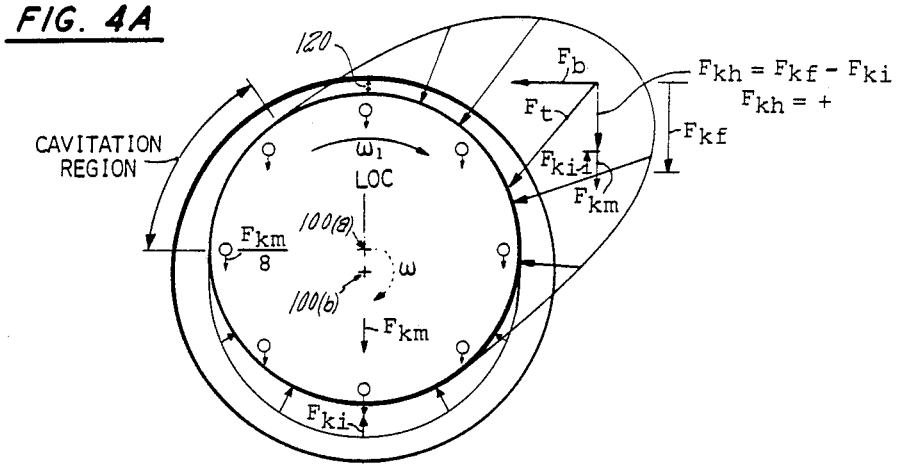
FIG. 4A and 4B are schematic representations of the structure shown in FIG. 3 illustrating the resultant forces acting on a shaft in a viscous damper.

The magnitude of the negative force $(-F_{ki})$ at speed $W_1$ is such that it reduces the effective stiffness characteristic of the system as will be shown with regard to the vector summation in FIG. 4A.

The vector summation in FIG. 4A of the mechanical spring force $(+F_{km})$ and the viscous stiffness force $(+F_{kf})$ is greater than the fluid inertial force $(F_{ki}.)$ These three forces $(+F_{km}, +F_{kf}, -F_{ki})$ with the viscous force $F_b$ opposing motion of the shaft in the tangential direction result in the vector total force $F_t$. The hydrodynamic spring force is positive but is reduced from the value that it would have if the fluid inertial force $-F_{ki}$ was absent. Thus, the fluid inertial force at rotor speed W1 has been overcome by the viscous stiffness force $F_{kf}$ of the fluid. The force in the positive direction is further increased by the mechanical spring force exerted by the rods of the support system.

All spring forces $(F_{km}; +F_{kf}, -F_{ki})$ are transmitted through the outer housing to the support structure which supports the housing and through the support housing to the outer casing. Accordingly, the spring forces resulting from forces imposed by the shaft may create some vibration in the outer casing. The damping force that opposes the orbiting motion of the shaft housing decreases the shaft imposed forces by transforming a portion of the orbital energy into heat energy.

Figure 4B:
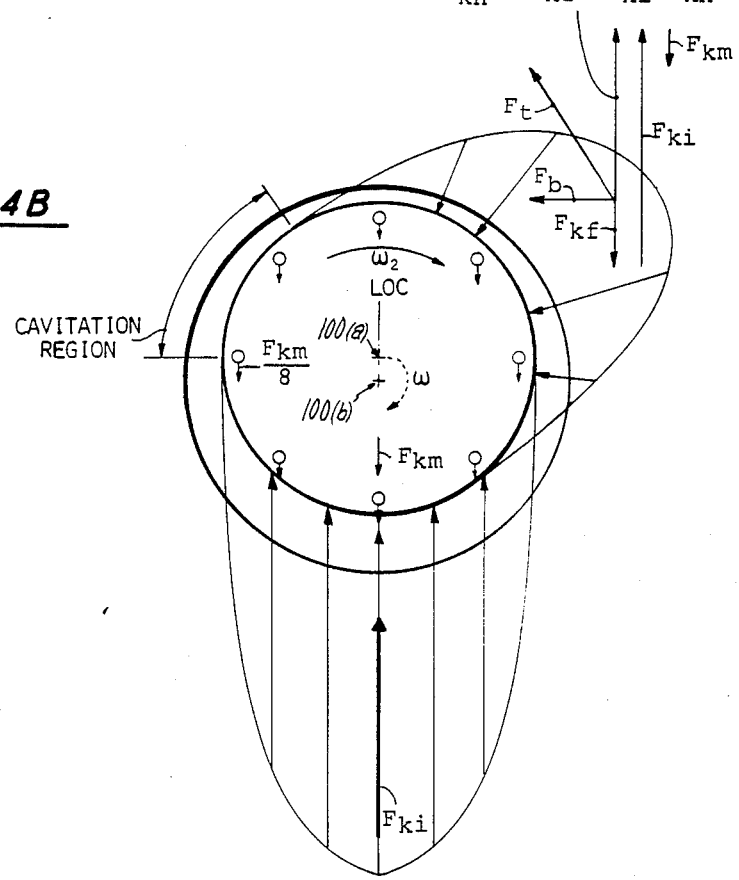

As the speed of the shaft is increased to $W_2$ as shown in FIG. 4B, the eccentricity of the shaft about the ideal axis of rotation 14b increases. As a result of the increase in speed and eccentricity (and, accordingly, Reynolds number) the fluid inertial force may become very large with an associated increase in the fluid inertial stiffness characteristic. The fluid inertial stiffness characteristic and its associated force $(-F_{ki})$ can act to such an extent that $-F_{ki}$ overcomes the forces $F_{km+Fkf}$ associated with the mechanical stiffness characteristic km of the rods and the viscous stiffness characteristic kf acting to oppose deflection of the rotor shaft. As a result, the associated spring force $(+F_{kf}; +F_{km}; +F_{ki})$ exerted by the fluid is negative. The summation of these fluid forces (that is, the hydrodynamic spring force $F_{kh}=F_{kf}-F_{ki}$) acts in the direction of deflection of the shaft and is greater than the mechanical spring force $F_{km}$ opposing deflection. Thus, $F_{kh}$ is negative.

Figure 5A:
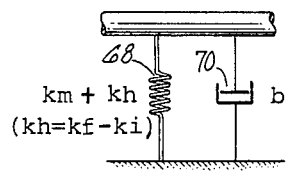
FIG. 5A and 5B are mechanical models for the support system of the present invention.

FIG. 5A shows a mechanical model for the support system that has the annular volume 86 filled with damping fluid. As a result, the support system includes both a spring 68 and a damper 70. The dashpot damper represents the viscous force $F_b$ exerted by the fluid on the housing by reason of viscous shear. The constant of proportionality for the damper at any given pressure of the oil is b, the coefficient of viscous damping.

The spring, as discussed above, has a spring constant or stiffness which depends on the mechanical stiffness characteristic km of the mechanical springs extending from the outer housing to the inner housing and the hydrodynamic stiffness characteristic of the fluid kh, (that is, kh=kf−ki). The total stiffness characteristic of the support system is the summation of the hydrodynamic and mechanical stiffness characteristics.

Figure 5B:
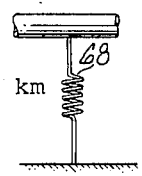

FIG. 5B show a mechanical model for the support system under operating conditions of the engine where the flow of oil is blocked to the annular volume 86. As a result, the viscous coefficient b is eliminated and the mechanical spring force $F_{km}$ is the only spring force. The associated stiffness characteristic is km. At this point the damping chamber is empty of damping fluid to such an extent that the fluid has no hydrodynamic stiffness characteristic to transmit vibratory forces from the rotating shaft to the stator structure nor viscous damping characteristic to provide damping to the rotating shaft.

It has been found the fluid inertial stiffness characteristic may become so large under certain circumstances that vibrations in the casing are increased by the presence of the damping fluid which provides damping to the rotor shaft.

It is believed the increase in vibration in the casing with damping of the shaft (even though damping acts to decrease vibration in the shaft) occurs to different degrees for three related reasons, all associated with the size of the fluid inertial force $-F_{ki}$ and the associated fluid inertial stiffness characteristic. First, as fluid inertial force increases, vibration in the shaft may result from increased deflection of the shaft at locations away from the bearing. Secondly, the decrease in shaft vibration due to fluid damping may be offset by the increased fluid inertial stiffness characteristic which, because of the stiffness and associated size of the force, may act to efficiently transmit vibrations from the shaft through the fluid to the outer housing and thence to the casing.

Finally, the critical speed characteristic of the rotor shaft is a function of the stiffness of the rotary machine including the stiffness of the support system. The nearness of the critical speed characteristic to the operating speed at a particular mode of vibration will be affected by the hydrodynamic stiffness characteristic of the fluid in the damper. As a result, the increased negative stiffness that results from the fluid inertial force $-F_{ki}$ may cause vibrations to increase by reason of a critical speed characteristic that is moved by the increase in stiffness to a speed within the operative speed range of the rotor shaft.

Similarly, it is believed the viscous damping characteristic and viscous stiffness coefficient may become so large under particular circumstances that both the transmission of vibratory forces to the outer casing and the change in critical speed may become a concern as set forth above. In all of those circumstances, blocking the flow of oil to the damping chamber will decrease vibrations in the casing.

Figure 6:
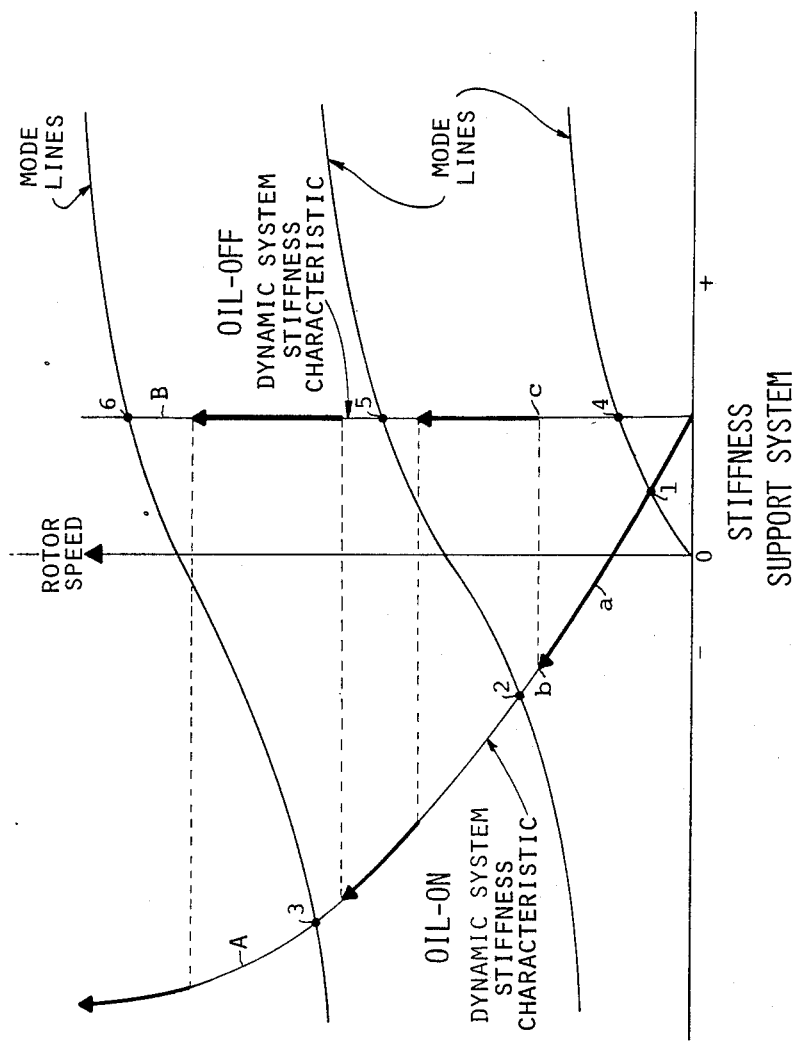
FIG. 6 is a graphical representation of the critical speed versus stiffness of a flexible support system of the type shown in FIG. 2.

FIG. 6 is a graphical representation of the stiffness of a flexible support system of the type shown in FIG. 2 versus speed of the rotor about its axis. Although rotor speed is the independent variable for these two parameters, rotor speed is plotted along the vertical axis for convenience. FIG. 6 illustrates the effect that blocking the flow of oil to the chamber has on stiffness and on the critical speed characteristics for different modes of vibration of the rotor shaft. Because the damper is activated or inactivated as a function of rotor speed, the system has two different stiffness characteristics.

Curve A shows the stiffness characteristic for the support system as pressurized fluid damping medium (in this case, lubricating oil) is flowed to and from the damping chamber at rates which insure the damper is filled with oil. The stiffness characteristic is non-linear because stiffness is generated in part by the oil film in the damping chamber and becomes a function of the amount of dynamic load being input into the damper. Thus, as rotor speed is increased (as shown by moving along the stiffness characteristic Curve A in the vertical direction), the stiffness for the particular design shown is first positive. this shows the mechanical stiffness characteristic and the viscous stiffness characteristic are greater than the negative fluid inertial stiffness characteristic associated with the fluid inertial force. As speed is increased and the fluid inertial force becomes more significant, the stiffness of the system reaches zero and then becomes negative. As speed is increased even further, the system stiffness becomes more and more negative.

Superimposed on this plot are lines of critical speed versus system stiffness of the rotor support system for the different modes of vibration of the shaft. The term mode of vibration refers to the Eigenvectors which describe the deflected shapes the rotor shaft assumes under operative conditions. The points of intersection between the stiffness characteristic with the oil on (shown in Curve A for the support system) and the critical speed line for a mode of vibration is the critical speed characteristic for that mode of vibration of the shaft. Thus, the shaft will have three critical speed characteristics for the support system with the damper activated, that is, at points 1, 2 and 3 corresponding to the three modes of vibration.

Curve B shows the stiffness characteristic for the support system as the flow of damping fluid (oil) to the damping chamber is blocked so that the damping chamber is empty of oil to such an extent that the oil has no hydrodynamic stiffness characteristic to transmit vibratory forces from the rotating shaft to the outer housing and has no viscous damping characteristic to provide damping by the fluid to the rotor shaft. The system stiffness is nearly constant because it is a spring constant and does not have a non-linear effect due to the presence of oil because the oil no longer exerts a spring force or a viscous damping force which opposes motion of the shaft. The intersection between the critical speed lines for the three modes of vibration and the stiffness characteristic shown in Curve B result in three critical speed characteristics for the support system with no oil damper at points 4, 5 and 6.

In FIG. 6, the dark arrows on the stiffness characteristic Curves A and B show at a given rotor speed whether the rotary machine is operating with the stiffness characteristic of Curve A (damper) or Curve B (no damper) Experience has shown that it is possible to operate one rotor system of the type shown in FIG. 2 with a FIG. 5A damper system at speeds of idle power or below (point a), pass through a critical speed characteristic (point 1), and still have enough damping so that damping of the resonance condition and the hydrodynamic stiffness resulting from orbital motion of the shaft and the concomitant pressure wave does not transmit undue vibration to the support structure and hence to the outer casing. However, as the rotor speed is increased, the system stiffness begins to increase in the negative direction (meaning that the force acts in the direction of deflection in the radial direction away from the ideal center). Experience has shown that the amount of vibratory energy transmitted via the stiffness of the oil to the outer casing becomes more significant. This may in part be due to the fact that a second critical speed characteristic (such as point 2) is closer as a result of the change in stiffness and therefore the rotor speed is also reaching a resonant frequency as well as transmitting vibrations through the increased stiffness of the oil film.

The flow of oil to the damping chamber is blocked (point b) and the support system almost instantaneously as the orbiting rotor forces oil from the damping chamber behaves as a FIG. 5B spring—no oil damper (point c) with a stiffness characteristic of the type shown in Curve B of FIG. 6. This has two beneficial affects. First, vibration is not transmitted via the oil film hydrodynamic stiffness characteristic to the outer housing and thence to the outer casing. Secondly, operation of the system at point c has moved the closest critical speed characteristic of the system further away from the operating speed of the rotor shaft. As a result, increased vibrations and amplitudes of deflection at the resonant frequency of the rotor shaft due to approaching, for example, the critical speed characteristic 5 are diminished in comparison to the vibrations and amplitudes which result from approaching the critical speed characteristic 2 of the FIG. 5A system which does have a viscous damper.

As will be realized, decreased vibration transmitted to the outer casing has at least two beneficial affects. First, it improves the fatigue life of components which are attached to the exterior of the engine and disposed within the engine itself which are adversely affected by long exposure to vibrations. Secondly, it eliminates the transmission of noise from the engine to the adjacent environment, such as the interior of an airplane or a turbine powered ship, making the environment within such craft more desirable by reason of the reduced level of noise.

Figure 7:
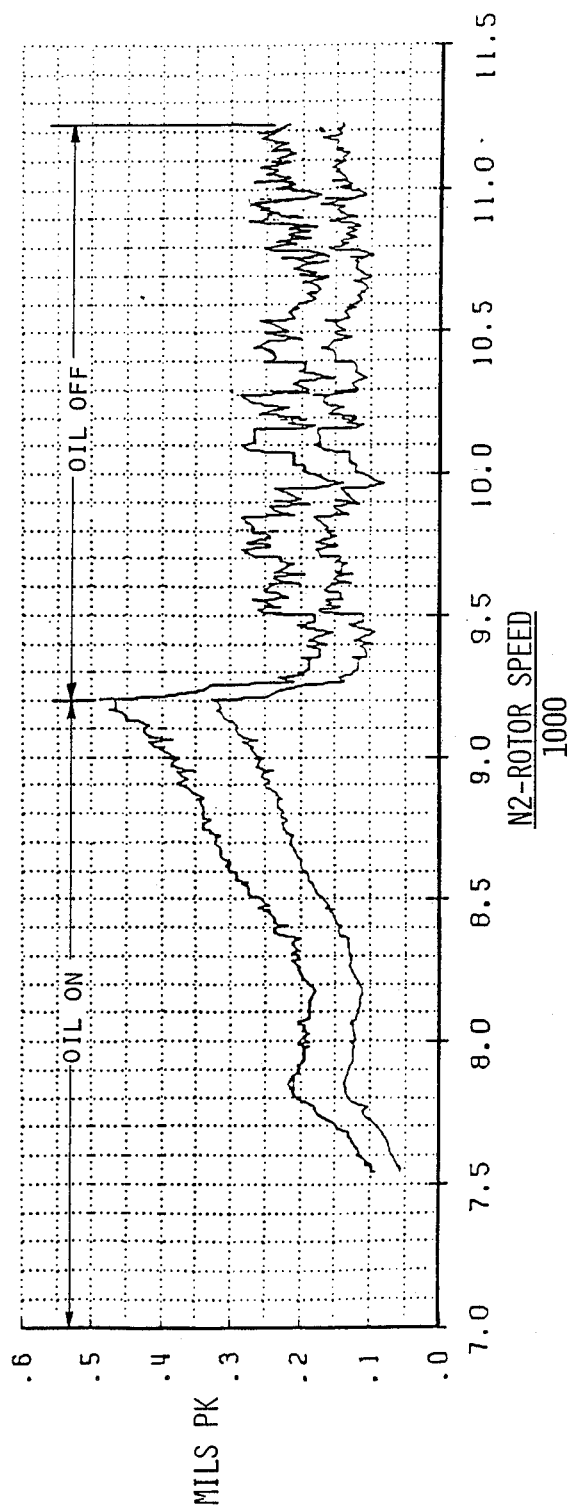
FIG. 7 is the graphical representation of actual vibrational movement of a casing in the horizontal direction as a function of rotor speed of a high pressure rotor assembly.

FIG. 7 demonstrates the decrease in casing vibration which occured during a test of a gas turbine engine using the present invention. FIG. 7 is the graphical representation of actual vibrational movement of a casing flange in mils measured in the horizontal direction as a function of rotational speed of the high pressure rotor assembly. The upper curve is the peak movement and the lower curve is the root mean square (rms) movement. It is believed a critical speed characteristic is encountered at about seventy-seven hundred (7,700) revolutions per minute. The movement of the casing is acceptably damped by the spring-damper system and the damper remains activated as speed is increased. As can be seen, the amplitude of vibration in the casing steadily increases as rotor speed increases from approximately eighty-four hundred (8,400) revolutions per minute to a peak at ninety-four hundred (9,400) revolutions per minute. At this point, the valve closes interrupting the flow of oil to the damping chamber. As a result, the hydrodynamic stiffness characteristic and viscous damping characteristic are not available to transmit vibrations from the rotor shaft to the outer housing of the support structure and the casing movement decreases dramatically to a value which is less than 60% of its original maximum value.

As will be realized, this on-off damper support system may be used to eliminate some or all of the critical speeds from the entire speed range of the rotor having a viscous damper by altering the damper/support stiffness as required.

Figure 8A:
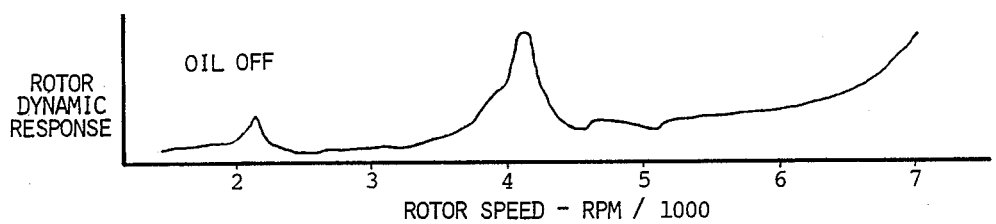
FIG. 8A, FIG. 8B, FIG. 8C, and FIG. 8D graphically represent rotor dynamic response as a function of rotor speed for a gas turbine engine.

FIG. 8A shows the results of operating a rotor test system which was a two-thirds scale rig of an actual gas turbine engine using a FIG. 5B spring support system. The system has critical speed characteristics at about two-thousand (2,000) and four thousand (4,000) revolutions per minute.

Figure 8B:
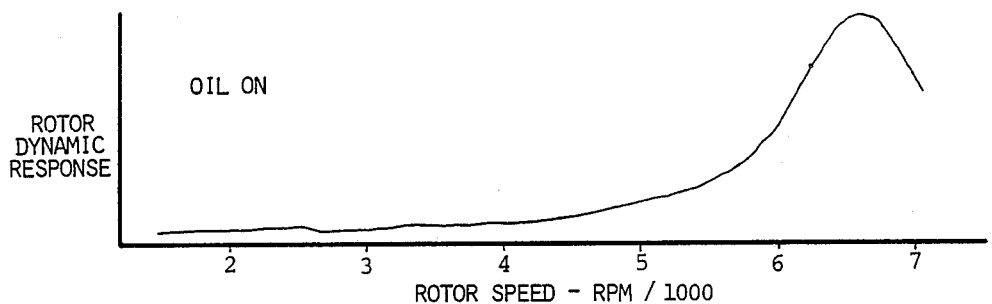

FIG. 8B shows the results of operating with a FIG. 5A spring damper system. The damping reduced vibration at the lower critical speed characteristics. Because the system has a different stiffness characteristic, a critical speed characteristic appears at about sixty-five hundred (6,500) revolutions per minute.

Figure 8C:
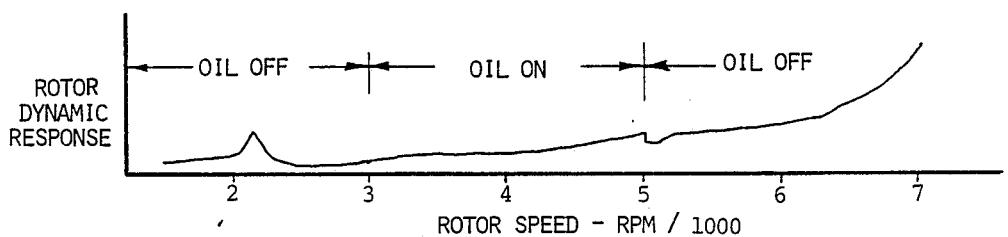

FIG. 8C shows the facility with which critical speeds can be avoided (or encountered if the vibration is acceptable) by using the present invention to operate or not operate at a critical speed characteristic.

Figure 8D:
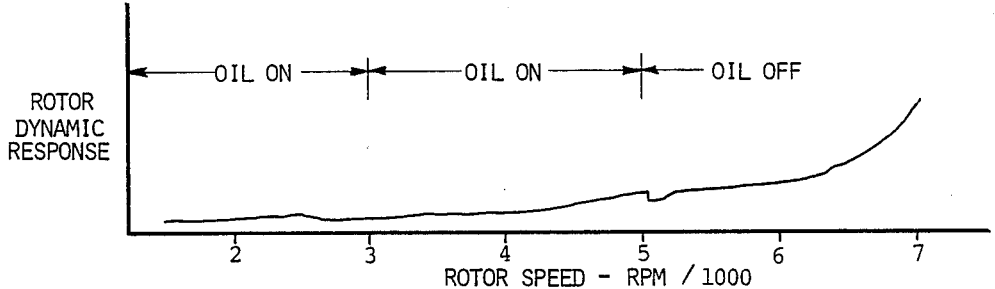

FIG. 8D is not an actual rig test, but is a cross-plot of the results of tests shown in FIG. 8A, 8B and 8C to show the results of allowing and blocking flow to avoid the critical speed characteristics of the system. Thus, the three peak vibrations were substantially decreased.

Figure 9:
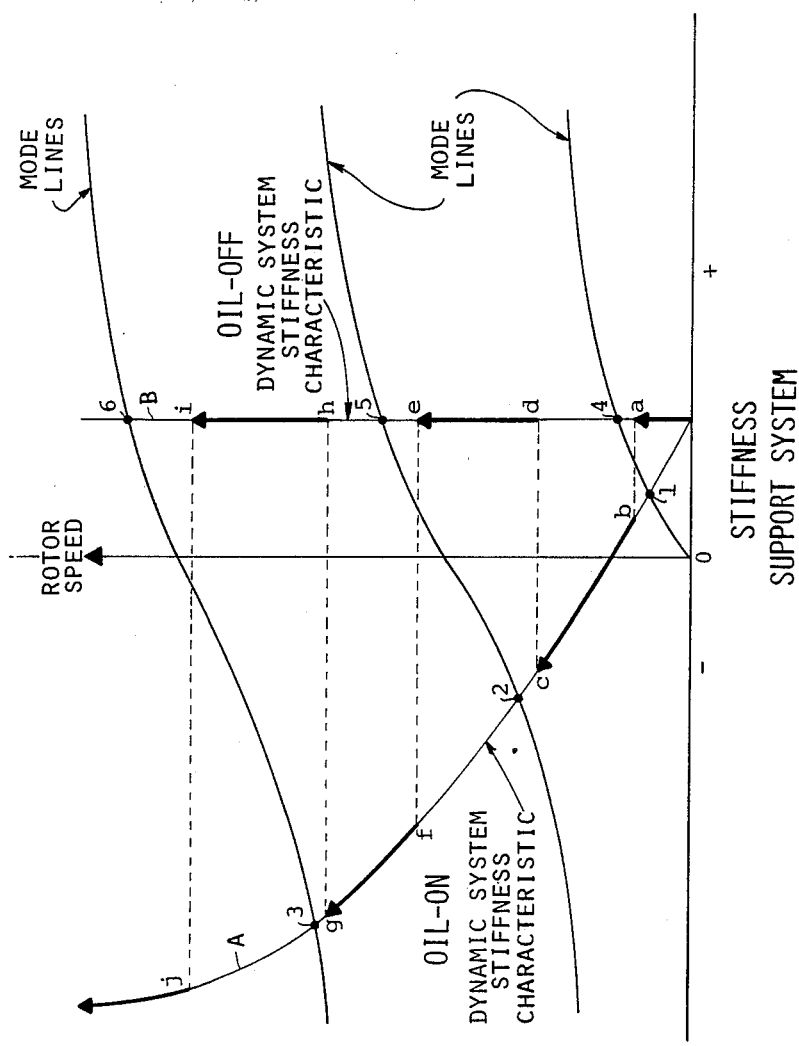
FIG. 9 is a graphical representation of critical speed versus stiffness of a flexible support system of the type shown in FIG. 2.

FIG. 9 is a graphical representation of the interaction of rotor speed and stiffness characteristics of the type which was used to arrive at the results shown in FIG. 8D. As shown in FIG. 9, it is possible to operate a rotary machine with the FIG. 5A or FIG. 5B system activated to traverse three critical speeds characteristics (1, 2 and 3) if the critical speed characteristics of each of these two systems are significantly different. By operating an engine with the FIG. 5A system or blocking the flow of oil and operating with the FIG. 5B system, it is possible to never directly cross any critical speed lines. For example, as the oil is allowed to flow (at points a, e and i) the critical speed being approached is rapidly dropped below the operating speed with minimal response as the rotating shaft pushes the oil in the cavity out, since amplitude growth of the rotor vibration requires time and coincident exciting speed. Similarly, in going from point c to d, the oil flow to the damper is blocked and the approached critical speed is driven ahead. Therefore, all critical speed characteristics can be avoided by alternately supplying or blocking the flow of oil to damping chamber and causing the system to operate as either a FIG. 5A or FIG. 5B system. This will enable lighter weight, higher speed engines without deleterious engine vibrations. Controlling the flow will provide significant cost savings in a design and development phase as well as in production test.

Although the invention has been shown and described with respect to detailed embodiments thereof, it should be understood by those skilled in the art that various changes in form and detail thereof may be made without departing from the spirit and the scope of the claimed invention.

We claim:

1. A method of operating a rotary machine which includes a stator assembly and rotor shaft extending axially in the machine, the rotor shaft being rotatable about an axis of rotation at a first speed and a second speed, the machine having a bearing which engages the shaft and which is supported by a support system which includes a spring support extending in the machine for supporting the bearing and a circumferentially continuous damping chamber disposed circumferentially about the bearing for damping vibrations in the shaft, comprising:

flowing a pressurized damping medium to the damping chamber and from the chamber at rates which insure the damper is filled with damping medium at the first speed of the shaft to activate the damper, the damping medium having a viscous damping characteristic which damps vibrations in the shaft and a stiffness characteristic that transmits vibratory forces from the shaft through the damping medium to the stator structure; and, blocking the flow of damping medium to the damping chamber and allowing flow from the chamber to inactivate the damper at the second speed of the shaft such that the damping chamber is empty of damping medium to such an extent that the medium has no stiffness characteristic to transmit vibratory forces from the rotating shaft to the stator structure and has no viscous damping characteristic to provide damping by the medium to the rotor shaft;

wherein the method of operating the engine provides a support system having a mechanical spring and viscous damper to support the shaft at the first speed and removes the viscous damper from the support system at the second speed.

2. The method of operating the rotary machine of claim 1 wherein the damping chamber has means for venting the chamber and wherein orbital movement of the rotor shaft about the axis of rotation forces damping medium from the damping chamber.

3. A method of operating a rotary machine which includes a stator assembly and rotor shaft which extends axially in the machine and is rotatable about an axis of rotation at a first speed and a second speed, the machine having support structure which includes a bearing which engages the shaft, a nonrotating housing for supporting the bearing, and a support system for the rotor shaft and bearing which includes a spring extending from the housing to adjacent stator structure and a fluid damping chamber disposed between the housing and the adjacent stator structure for damping vibrations in the shaft, comprising:

flowing a pressurized fluid damping medium through the stator structure to the damping chamber and from the chamber at rates which insure the damper is filled with fluid at the first speed of the shaft to activate the damper, the fluid damping medium having a viscous damping characteristic which damps vibrations in the shaft and a hydrodynamic stiffness characteristic that transmits vibratory forces from the shaft through the damping medium to the stator structure; and, blocking the flow of fluid damping medium to the damping chamber and allowing flow from the chamber to inactivate the damper at the second speed of the shaft such that the damping chamber is empty of damping fluid to such an extent that the fluid has no hydrodynamic stiffness characteristic to transmit vibratory forces from the rotating shaft to the stator structure and has no viscous damping characteristic to provide damping by the fluid to the rotor shaft;

wherein the method of operating the machine provides a support system having a mechanical spring and viscous damper to support the shaft at the first speed and removes the viscous damper from the support system at the second speed.

4. The method of operating the rotary machine of claim 3 wherein the step of blocking the flow of fluid damping medium to the cavity includes the step of sensing the rotating speed of the shaft and shutting off the flow of fluid damping medium to the damping chamber at the second speed such that an air gap exists between the housing and the stator structure at the second speed.

5. The method of operating the rotary machine of claim 3 wherein the step of blocking the flow of fluid damping medium to the damping chamber includes the step of sensing the rotating speed of the shaft by pressurizing the fluid damping medium flowing to the damping chamber so that the level of fluid pressure is indicative of the speed of the rotor shaft and blocking the flow of fluid damping medium to the damping chamber in response to the level of pressure in the damping medium.

6. The method of operating the rotary machine of claim 5 wherein the engine further includes a check valve having a poppet moveable from an open to a closed position in response to the level of pressure of the fluid damping medium; and, wherein the step of blocking the flow of fluid damping medium to the damping chamber includes flowing pressurized fluid damping medium to the check valve, the pressure of the fluid damping medium forcing the poppet to the closed position as the rotor shaft reaches the rotor speed at which the flow of fluid damping medium to the damping chamber is blocked.

7. The method of operating the rotary machine of claim 6 wherein the stator structure of the engine further includes an outer housing which is spaced radially from the inner housing to form the damping chamber, the stator structure includes stator structure which is spaced from the outer housing and which supports the check valve and the step of flowing the fluid damping medium to the damping cavity includes the step of flowing the fluid damping medium to the check valve and flowing the fluid damping medium from the check valve to the damping chamber.

8. The method of operating the rotary machine of claim 4 wherein the engine includes an engine control which senses the speed of the rotatable shaft and wherein the engine control sends a electrical signal to a solenoid operated valve to move the solenoid operated valve from the open to the closed position for blocking the flow of fluid damping medium to the damping chamber at the second speed of the shaft.

9. The method of operating the rotary machine of claim 3 wherein the rotatable shaft has at least two modes of vibration over the operating speed of the engine and wherein the support system rotary machine has a first stiffness characteristic with the damping chamber filled with fluid damping medium to activate the damping chamber, the first stiffness characteristic having associated critical speed characteristics at the first and second modes of vibration which are the first and second critical speed characteristics of the rotary machine and wherein the support systems of the rotary machine with the damping chamber inactivated has a second stiffness characteristic having associated critical speed characteristics at the first and second modes of vibration which are the third and fourth critical speed characteristics and wherein, as rotation of the shaft is increased in speed from zero to a normal operative speed of the shaft, the method includes the step of activating the damper or inactivating the damper to change the critical speed characteristic of the support system such that the rotary machine never operates at a critical speed characteristic for the support system.

10. The method of operating the rotary machine of claim 3 wherein the rotatable shaft has at least two modes of vibration over the operating speed of the engine and wherein the support system has a first stiffness characteristic with the damping chamber filled with fluid damping medium to activate the damping chamber, the first stiffness characteristic having associated critical speed characteristics at the first and second modes of vibration which are the first and second critical speed characteristics of the support system and wherein the support system with the damping chamber inactivated has a second stiffness characteristic having associated critical speed characteristics at the first and second modes of vibration which are the third and fourth critical speed characteristics and wherein, as rotation of the shaft is increased in speed from zero to a normal operative speed of the shaft, the method includes the step of activating the damper at the first critical speed characteristic to provide viscous damping to the shaft and inactivating the damper to change the critical speed characteristic of the support system such that the rotary machine never operates at the second, third and fourth critical speed characteristics for the support system.

* * * * *